(12) United States Patent
Senft et al.

(10) Patent No.: US 12,485,872 B2
(45) Date of Patent: Dec. 2, 2025

(54) BELT LOSS CONSIDERATION FOR DETERMINATION OF ELECTRIC MOTOR TORQUE SPLIT

(71) Applicant: FCA US LLC, Auburn Hills, MI (US)

(72) Inventors: Stefan Senft, Essen (DE); Andryas Mawardi, Rochester, MI (US); Ashay Sharma, Troy, MI (US); Rama Rohit Sagi, St. Joseph, MI (US); Nadirsh Patel, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 226 days.

(21) Appl. No.: 18/342,267

(22) Filed: Jun. 27, 2023

(65) Prior Publication Data

US 2025/0001998 A1    Jan. 2, 2025

(51) Int. Cl.
*B60W 20/11* (2016.01)
*B60W 10/06* (2006.01)
*B60W 10/08* (2006.01)

(52) U.S. Cl.
CPC ......... *B60W 20/11* (2016.01); *B60W 10/06* (2013.01); *B60W 10/08* (2013.01); *B60W 2510/10* (2013.01); *B60W 2510/244* (2013.01); *B60W 2710/0666* (2013.01); *B60W 2710/083* (2013.01)

(58) Field of Classification Search
CPC ...... B60W 20/11; B60W 10/06; B60W 10/08; B60W 2510/10; B60W 2510/244; B60W 2710/0666; B60W 2710/083; Y02T 10/62
See application file for complete search history.

(56) References Cited

U.S. PATENT DOCUMENTS

| | | | |
|---|---|---|---|
| 7,977,896 B2 | 7/2011 | Heap et al. | |
| 8,135,519 B2 | 3/2012 | Heap et al. | |
| 8,285,462 B2 | 10/2012 | Heap et al. | |
| 8,761,977 B2 | 6/2014 | Chan et al. | |
| 2008/0220934 A1* | 9/2008 | Babcock | B60W 20/30 701/22 |
| 2012/0277963 A1* | 11/2012 | Xia | B60K 6/365 701/58 |
| 2016/0009268 A1* | 1/2016 | Tamai | B60K 6/445 903/930 |

FOREIGN PATENT DOCUMENTS

EP    2937554 A1 * 10/2015    ............ B60W 10/06

* cited by examiner

*Primary Examiner* — Brian P Sweeney
(74) *Attorney, Agent, or Firm* — Jeremy J. Klobucar

(57) ABSTRACT

Torque control techniques for a multi-motor electrified powertrain of an electrified vehicle include determining a total torque request to be satisfied by the multi-motor electrified powertrain, wherein a first electric motor is connected to a crankshaft of an engine via a belt as part of a belt-driven starter-generator (BSG), estimating a torque loss associated with the belt based on stored data and an engine speed or a BSG speed, determining an optimized torque split of the total torque request between the first electric motor and a second electric motor based on the estimated belt torque loss and to minimize battery power, determining torque commands for the engine and the first and second electric motors based on the determined optimized torque split, and controlling the multi-motor electrified powertrain based on the determined torque commands for the engine and the first and second electric motors.

16 Claims, 3 Drawing Sheets

BELT LOSS CONSIDERATION FOR DETERMINATION OF ELECTRIC MOTOR TORQUE SPLIT

FIELD

The present application generally relates to electrified vehicles and, more particularly, to techniques for a belt loss consideration for the determination of electric motor torque split.

BACKGROUND

An electrified vehicle has an electrified powertrain including one or more electric motors and an optional internal combustion engine. One type of electrified powertrain includes a front-end accessory drive (FEAD) system or belt-driven starter-generator (BSG) unit. These belt-based systems have inherent losses over time due to, for example, belt tension and friction variations. Conventional torque control systems do not account for these belt-based losses, which could result in incorrect/inaccurate torque calculations. For electrified vehicles having multiple electric motors, this also could result in non-optimal motor torque split or distribution calculations. The only conventional solution to this problem (typically unaddressed) is to increase engine torque as a function of commanded BSG torque to correct for these losses, but this is still non-optimal from a multi-motor torque split perspective and, in instances where the engine torque is maximized or saturated, engine torque cannot be further increased. Accordingly, while such conventional electrified vehicle torque control systems do work well for their intended purpose, there exists an opportunity for improvement in the relevant art.

SUMMARY

According to one example aspect of the invention, a torque control system for a multi-motor electrified powertrain of an electrified vehicle, the multi-motor electrified powertrain comprising an engine and first and second electric motors, is presented. In one exemplary implementation, the torque control system comprises a torque request determinator configured to determine a total torque request to be satisfied by the multi-motor electrified powertrain, wherein the first electric motor is connected to a crankshaft of the engine via a belt as part of a belt-driven starter-generator (BSG), and a control system configured to estimate a torque loss associated with the belt based on stored data and an engine speed or a BSG speed, determine an optimized torque split of the total torque request between the first and second electric motors based on the estimated belt torque loss and to minimize battery power, determine torque commands for the engine and the first and second electric motors based on the determined optimized torque split, and control the multi-motor electrified powertrain based on the determined torque commands for the engine and the first and second electric motors, wherein the torque commands are better optimized and therefore result in greater overall multi-motor electrified powertrain torque compared to a conventional torque split that does not account for the torque loss associated with the belt.

In some implementations, the losses used to optimize the torque split are a quadratic fit for a given electric motor speed as a function of the commanded electric motor torque. In some implementations, a donut-shaped region is defined in an TX/TY torque domain for minimum and maximum battery power. In some implementations, an optimized torque split equation solved for Ty produces a line, and wherein an intersection of the line with the donut-shaped region corresponds to the optimal torque split. In some implementations, the optimal torque split is an intersection point of the line with the donut-shaped region that is closest to an origin point of the line.

In some implementations, the engine and the BSG are associated with a first axle of the electrified vehicle and the second motor is associated with a different second axle of the electrified vehicle. In some implementations, the first axle is front axle and the second axle is a rear axle, and wherein the optimized torque split is a front/rear torque split between the first/front and second/rear axles. In some implementations, the control system is not configured to increase an engine torque command as a function of a first electric motor torque command.

According to another example aspect of the invention, a torque control method for a multi-motor electrified powertrain of an electrified vehicle, the multi-motor electrified powertrain comprising an engine and first and second electric motors, is presented. In one exemplary implementation, the method comprises determining, by a control system, a total torque request to be satisfied by the multi-motor electrified powertrain, wherein the first electric motor is connected to a crankshaft of the engine via a belt as part of a BSG, estimating, by the control system, a torque loss associated with the belt based on stored data and an engine speed or a BSG speed, determining, by the control system, an optimized torque split of the total torque request between the first and second electric motors based on the estimated belt torque loss and to minimize battery power, determining, by the control system, torque commands for the engine and the first and second electric motors based on the determined optimized torque split, and controlling, by the control system, the multi-motor electrified powertrain based on the determined torque commands for the engine and the first and second electric motors, wherein the torque commands are better optimized and therefore result in greater overall multi-motor electrified powertrain torque compared to a conventional torque split that does not account for the torque loss associated with the belt.

In some implementations, the losses used to optimize the torque split are a quadratic fit for a given electric motor speed as a function of the commanded electric motor torque. In some implementations, a donut-shaped region is defined in an TX/TY torque domain for minimum and maximum battery power. In some implementations, an optimized torque split equation solved for Ty produces a line, and wherein an intersection of the line with the donut-shaped region corresponds to the optimal torque split. In some implementations, the optimal torque split is an intersection point of the line with the donut-shaped region that is closest to an origin point of the line.

In some implementations, the engine and the BSG are associated with a first axle of the electrified vehicle and the second motor is associated with a different second axle of the electrified vehicle. In some implementations, the first axle is front axle and the second axle is a rear axle, and wherein the optimized torque split is a front/rear torque split between the first/front and second/rear axles. In some implementations, the control system is not configured to increase an engine torque command as a function of a first electric motor torque command.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, conventional electrified vehicle torque control systems do not account for these belt-based losses, which could result in incorrect/inaccurate torque calculations. For electrified vehicles having power splits between multiple electric motors, this also could result in non-optimal motor torque split or distribution calculations. The only conventional solution to this problem (typically unaddressed) is to increase engine torque as a function of commanded BSG torque to correct for these losses, but this is still non-optimal from a multi-motor torque split perspective and, in instances where the engine torque is maximized or saturated, engine torque cannot be further increased. Accordingly, improved techniques that account for belt-based losses (of a FEAD or BSG system) in calculating electric motor torques and, more particularly, multi-motor torque splits, are presented. These techniques leverage the previous techniques that optimize motor torque splits to minimize battery power, which is based on a quadratic fit for a given speed as a function of commanded motor torque and is also known as the "donut space" method (as the optimization regions appear donut-shaped between respective circles on a graph/plot). In short, a point on a line intersecting this donut region that is closest to an original point is the optimal motor torque split and is converted into torque commands. In other words, the previous techniques are repurposed or remapped for mechanical torque at the crankshaft and not at the motor output.

Figure 1:
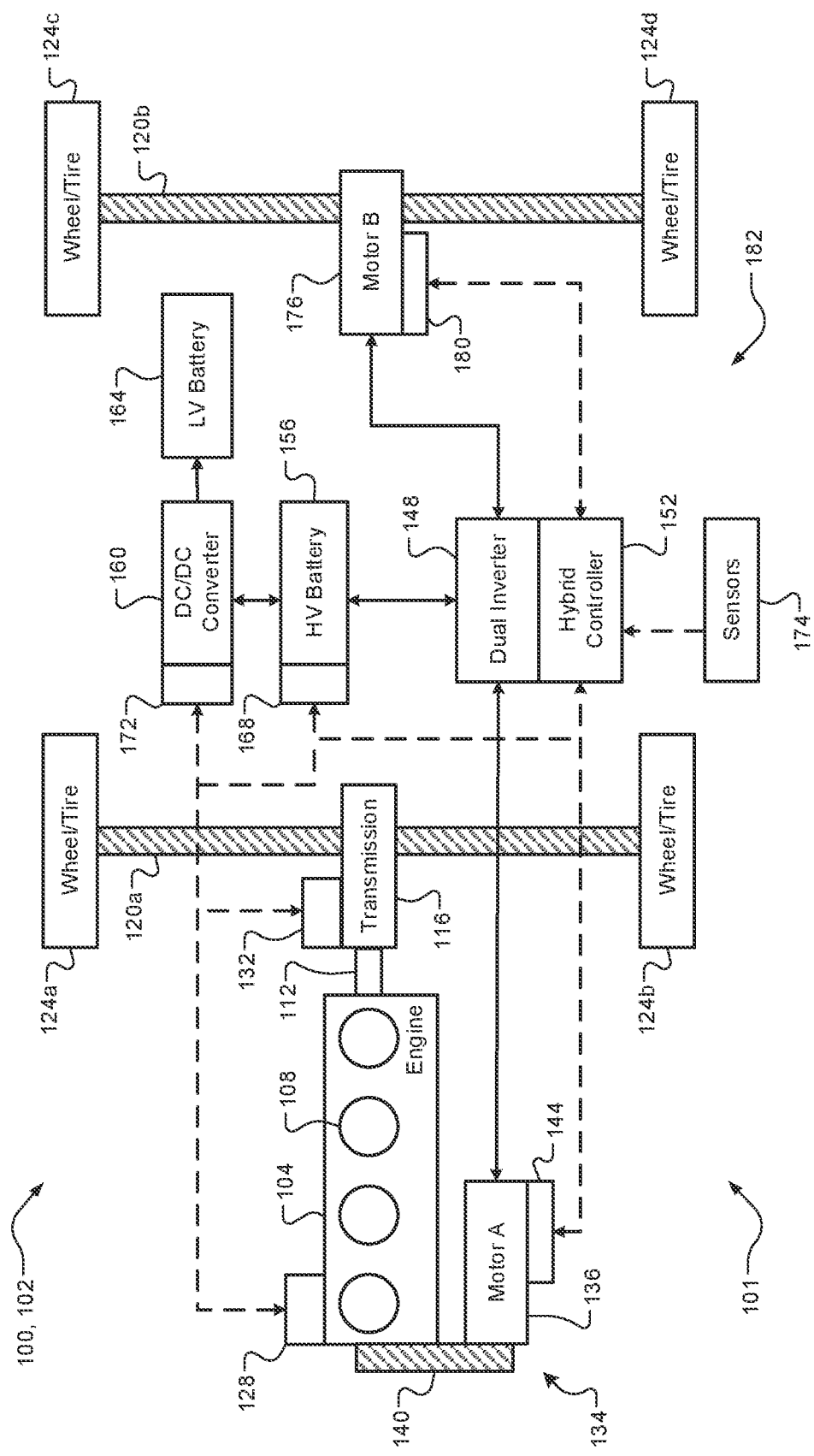
FIG. 1 is a diagram of an electrified vehicle having an example torque control system for a multi-motor electrified powertrain with an engine and a first electric motor connected to each other via a belt and a second electric motor according to the principles of the present application.

Referring now to FIG. 1, a diagram of an electrified vehicle 100 having an example torque control system 101 according to the principles of the present application is illustrated. The electrified vehicle 100 has an electrified powertrain 102 including an internal combustion engine 104 that is configured to combust a mixture of air and fuel (diesel, gasoline, etc.) within cylinders 108 to drive pistons (not shown) that generate torque at a crankshaft 112, which could be used for vehicle propulsion and/or battery system recharging. While only four cylinders are shown, it will be appreciated that the engine 104 could include any suitable number of cylinders. The drive torque at the crankshaft 112 is transferred by a transmission 116 (e.g., a multi-speed automatic transmission) to a front axle 120a of the electrified vehicle 100. The front axle 120a is in turn connected to front wheels/tires 124a, 124b. The engine 104 is controlled by a respective control unit/module 128 (e.g., an engine control module, or ECM), and the transmission 116 is controlled by a respective control unit/module 132 (e.g., a transmission control module, or TCM). A first electric motor 136 ("Motor A") is coupled to the crankshaft 112 by a wearable drive device 140 such as a belt. It will be appreciated that the electric motor 136 and the belt 140 could be part of a BSG unit 134 or another FEAD system. The electric motor 136 is capable of acting both as a torque provider by providing torque to the crankshaft 112 (e.g., to start the engine 104) and a torque consumer by converting a portion of the drive torque at the crankshaft 112 into electrical energy.

The electric motor 136 (i.e., the BSG unit 134) is capable of quickly starting the engine 104, such as in response to an electric-only to parallel mode transition being initiated. The BSG unit 134 could also be utilized to provide additional or supplemental drive torque at the front axle 120a. The electric motor 136 is controlled by a respective control unit/module 144. The electric motor 136 either receives electrical energy from or provides electrical energy to a dual inverter 148. A hybrid controller 152 (e.g., a hybrid control processor, or HCP) utilizes some type of interface (software, controller area network (CAN), etc.) to communicate torque requests to intermediate motor control processors (MCPs, e.g., units/modules 144, 180). This hybrid controller 152 also communicates with the other control modules/units such that the vehicle 100 generates a desired drive torque, e.g., based on a driver torque request. The dual inverter 148 is also connected to a high voltage (HV) battery 156. While a single HV battery 156 is shown, it will be appreciated that there could be two HV battery systems 156 (e.g., one per electric motor) and that there could be two inverters (i.e., one per electric motor 136, 176, each having its own set of insulated bipolar gate transistors or IGBTs). The dual inverter 148 converts alternating current (AC) (to/from the electric motor 136) into direct current (DC) (to/from the HV battery 156 and vice-versa. The HV battery 156 is connected to a DC-DC converter 160, which steps-down a voltage of the HV battery 156 to recharge a low voltage (LV) battery 164, such as a 12 volt (V) lead-acid or lithium-ion (Li-ion) battery system.

The HV battery 156 is controlled by a respective control unit/module 168 and the DC-DC converter 160 is controlled by a respective control unit/module 172, both of which are also in communication with the hybrid controller 152. The hybrid controller 152 also receives measurements from other sensors 174, such as, but not limited to, a front and rear wheel speed sensors, a vehicle speed sensor, a steering wheel angle sensor, a yaw rate sensor, and a lateral acceleration sensor. The electrified powertrain 102 further includes a second electric motor 176 ("Motor B"). This electric motor 176 could also be referred to as a traction motor because it provides drive torque to a rear axle 120b, which is in turn connected to rear wheels/tires 124c, 124d. It will be appreciated that the term "axle" as used herein includes a solid axle, half shafts, or any other suitable axle configuration. It will also be appreciated that the front and rear axles 120a, 120b could have the same axle configuration or different axle configurations. The electric motor 176 receives electrical energy (AC) from the dual inverter 148 in order to generate this drive torque. The electric motor 176 is controlled by a respective control module/unit 180, which is also in communication with the hybrid controller 152. It will be appreciated that these various controllers and control units/modules 128, 132, 152, 168, 172, 180 are collectively referred to herein as "a control system" and generally referenced as 182. The specific operation of the control system 182 as it relates to the techniques of the present application, including specific equations utilized, will now be described in greater detail.

While the electrified powertrain 102 is shown and described as having electric motors 136, 176 associated with different front/rear axles 120a, 120b, it will be appreciated that this is merely one non-limiting exemplary configuration and that the techniques of the present application are applicable to any multi-motor electrified powertrain. For example, in another example configuration of the electrified powertrain 102, both electric motors 136, 176 could be configured to apply torque at the same one axle in the following series configuration to: BSG (including the first electric motor)-engine-clutch-second electric motor-transmission.

Figure 2:
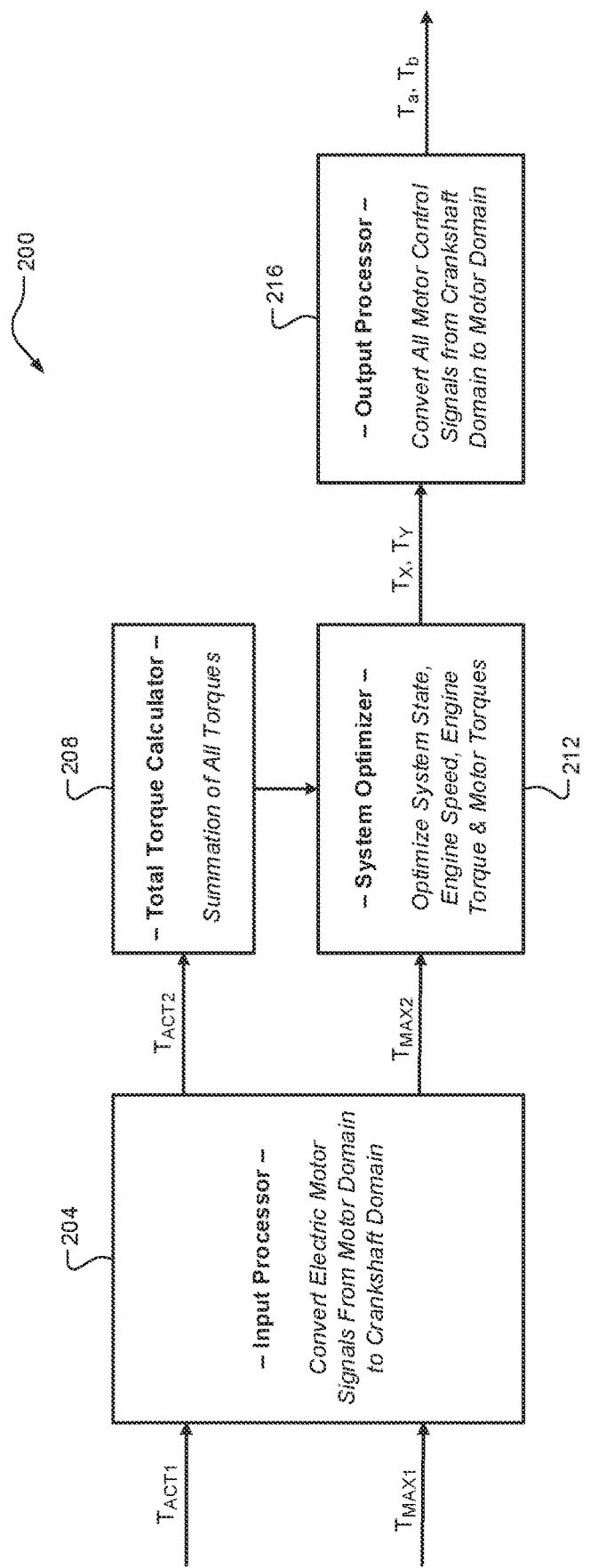
FIG. 2 is a functional block diagram of an example architecture for the torque control system of FIG. 1 according to the principles of the present application.

Referring now to FIG. 2 and with continued reference to FIG. 1, a functional block diagram of an example architecture 200 for the torque control system 101 of FIG. 1 is illustrated. While the example architecture 200 specifically references the torque control system 101 of FIG. 1, it will be appreciated that this architecture 200 could be applicable to other electrified vehicle controllers or control systems (e.g., other electrified powertrain configurations). The following processing steps/operations and the equations below are utilized by in input processor 204, a total torque calculator 208, a system optimizer 212, and an output processor 216, which perform the various steps/operations as generally described in FIG. 2 including the transformation between motor and crankshaft domains.

As previously mentioned, existing control algorithms were capable of performing optimal motor torque split to minimize battery power. The losses used to optimize this split are a quadratic fit for a given speed as a function of the commanded motor torque. The existing control algorithms utilized the following equations:

$$P_{a,Elec} = N_a \cdot T_a + \text{Loss}, \quad (1)$$

where $P_{a,Elec}$ is the electrical power of the first electric motor 116a, $N_a$ is the rotational speed of the first electric motor 116a, $T_a$ is the torque of the first electric motor 116a, and Loss is the loss at the output of the belt system (rather than the loss at the motor output as previously done).

A quadratic fit of losses for a given speed as a function of motor torque $T_a$ is:

$$P_{a,Elec} = N_a \cdot T_a + a \cdot T_a^2 + b \cdot T_a + c, \quad (2)$$

and $$P_{a,Elec} = (A_1 \cdot T_a + A_2)^2 + C, \quad (3)$$

where $A_1$, $A_2$, and $C$ are defined such that:

$$a = A_1^2 \quad (4)$$

$$(b + N_a) = 2A_1 A_2, \quad (5)$$

-continued and $$c = A_2^2 + C. \quad (6)$$

After performing a coordinate transformation of $T_a$ to the $T_x$ domain:

$$P_{a,Elec} = T_x^2 + C, \quad (7)$$

with $$T_x = A_1 \cdot Ta + A_2,$$

and

Similarly (as above) for the second electric motor 116b and the coordinate transformation of $T_b$ to the $T_y$ domain:

$$P_{b,Elec} = T_y^2 + D. \quad (8)$$

Substituting the following power equations for motor electrical power yields the following circular equations (10):

$$P_{Bat} = P_{a,Elec} + P_{b,Elec} + P_{Acc} \quad (9)$$

where $P_{Bat}$ is total battery power and $P_{Acc}$ is the accessory load on the LV battery system 160 (i.e., the power drawn therefrom), and $$P_{Bat} - P_{Acc} - C - D = T_x^2 + T_y^2. \quad (10)$$

When plotting these two circle equations in a $T_x$-$T_y$ domain for minimum and maximum battery powers (charging and discharging), a figure (i.e., a region defined therebetween) that has similarity to a donut is created. Hence, this visualization is also referred to as the "donut space." The optimal torque split can now be found in the following way:

$$T_o = k_i \cdot T_i + k_a \cdot T_a + k_b \cdot T_b + f(No, NoDot, Ni, NiDot, \ldots), \quad (11)$$

where $T_o$ is output torque, $T_i$ is engine torque, $T_{o,Misc}$ is/are miscellaneous constant torques that have an effect on output torque, $k_x$ is a coefficient to express how the component x impacts output torque delivery, and No is output speed.

For a given $T_i$, this simplifies to:

$$T_o = k_a \cdot T_a + k_b \cdot T_b + T_{o,Misc}. \quad (12)$$

Replacing all constant terms to $T_{o,Misc}$, we obtain:

$$T_o = k_a \frac{T_x - A_2}{A_1} + k_b \cdot \frac{T_Y - B_2}{B_1} + T_{o,Misc}. \quad (13)$$

Finally, after performing a coordinate transformation, we can solve for $T_y$:

$$\left[T_o - T_{o,Misc} - k_a \cdot \frac{T_x - A_2}{A_1}\right] \cdot \frac{B_1}{k_b} + B_2 = T_y. \quad (14)$$

The solution for Ty can now also be plotted in same graph as the "donut space." It means different combinations of $T_x$ and $T_y$ ($T_a$ and $T_b$) that all are producing the same output torque. The point on that line, that is within the donut-shaped region and has the shortest distance to the origin is the optimal motor torque split, now needs to be converted back into $T_a$ and $T_b$ domain to be actuated.

Hence, the proposed solution could be described as effectively a remapping of the existing algorithm in the manner as shown in FIG. 2. That is, the proposed algorithm to incorporate the losses of the belt 140 mainly contains two domain conversions on the input and output processing (see below) and the utilization of the previously existing donut space algorithms including loss parameter fitting that consider the losses of the belt system, i.e. that the mechanical torque at the crankshaft is used for the mapping and fitting and not the mechanical torque at the motor output (again, see below).

The proposed algorithm can be divided into offline and online activities. First (e.g., in offline activity), the control system 182 finds or determines the FEAD/BSG loss at the respective electric motor's rotor—the rotor domain—but its specific calculation uses crank domain torque as shown below. The donut space fit from the equation(s) above correlates electrical power and electric motor torque needs to be adjusted to thereby obtain:

$$P_{a,Elec} = N_a \cdot T_a + a_{old} \cdot T_a^2 + b_{old} \cdot T_a + c_{old} + A \cdot T_a^2 + B \cdot T_a + C, \quad (15)$$

where A, B and C can for example be determined in the following way. First, FEAD/BSG loss simulation data obtained from a respective development/testing team as a function of $N_i$, $T_a$ for wide-open throttle (WOT) and engine motoring maneuvers to apply a $2^{nd}$ order regression model. The obtained data provides torque loss at the crank ($FEAD_{loss@Crank}$) which is taken to the rotor by dividing with the belt ratio (Belt ratio) as follows:

$$FEAD_{Loss@rotor} = \left(\frac{FEAD_{loss@Crank}}{\text{Belt ratio}}\right). \quad (16)$$

It will be appreciated that the above=described integration with the donut space method is merely one example application or method of the present application. Another method to determine the belt losses for the fit is to run a corresponding measurement campaign at a dynamometer with measurements taken at the required physical points.

The average of WOT and motoring data is taken to apply a quadratic fit for each engine speed:

$$FEAD_{Loss@rotor} = \frac{\left([A] \cdot T_{a\_Crank}^2 + [B] \cdot T_{a\_Crank} + [C]\right)}{P1f}, \quad (17)$$

where A, B, C=f (Ni) (similar to the previously described "donut space" calibrations) and $FEAD_{Loss}$=f (Ni, $T_{a_{Crank}}$ where Ni is engine speed and $T_{a_{Crank}}$ is torque at the crank domain. This equation is now converted back to the original format with combined and recalculated coefficients. The electric motor's rotor electric power computation in the existing "donut space" will now use the effective domain $T_a$ solutions:

$$P_{a,Elec} = \left(A_1 \cdot T_{a_{Eff}} + A_2\right)^2 + C, \quad (18)$$

where $T_{a_{Eff}}$ is the torque of Motor A 136 in a domain at which optimization algorithm will operate.

Second, the control system 182 uses FEAD/BSG loss at rotor to convert motor torque to appropriate domain (online calculation). An FEAD/BSG Loss model is developed to convert Motor A torque nodes into the "effective domain" from the "rotor domain" and vice-versa as needed throughout the software (e.g., executable by the HCP 152). This will enable optimization libraries to operate under true $T_a$ to $T_o$ relationship ($T_{a@Crank}=T_{a_{Eff}}$*Belt ratio):

$$T_{a_{Eff}} = T_{a_r} - FEAD_{Loss@rotor}. \quad (19)$$

Figure 3:
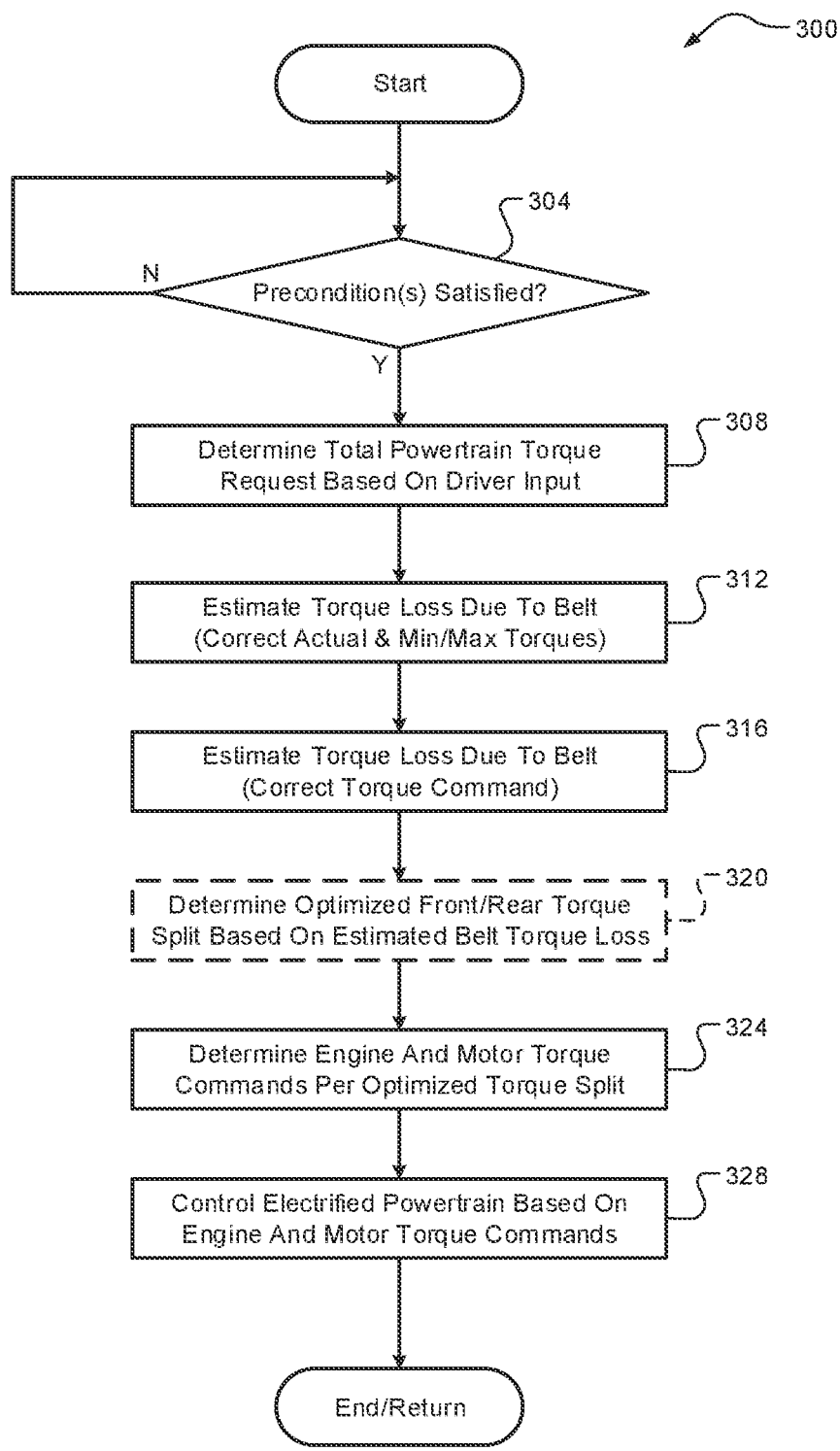
FIG. 3 is a flow diagram of an example electrified vehicle torque split optimization method for a multi-motor electrified powertrain having an engine and a first electric motor connected to each other via a belt and a second electric motor according to the principles of the present application.

Referring now to FIG. 3, a flow diagram of an example electrified vehicle torque split optimization method 300 for an electrified powertrain having an engine and a first electric motor connected to each other via a belt and associated with a first axle and a second electric motor associated with a second axle according to the principles of the present application is illustrated. While the electrified vehicle 100 and its components are specifically referenced for illustrative/descriptive purposes, it will be appreciated that the method 300 could be applicable to any electrified vehicle having a suitably-configured electrified powertrain. At 304, the controller 144 determines whether a set of one or more preconditions are satisfied. This could include, for example only, the electrified vehicle 100 being powered on and running and there being no malfunctions or faults present that would otherwise affect the operation of the torque control techniques of the present application. When false, the method 300 ends or returns to 304. When true, the method 300 continues to 308.

At 308, the control system 182 determines a total torque request to be satisfied by the electrified powertrain 102. At 312, the control system 182 estimates (e.g., offline, based on empirical data) a torque loss associated with the belt 140 based on stored data and an engine speed or BSG speed to correct the actual torque produced and the maximum/minimum torque limits. At 316, the control system 182 again estimates (e.g., offline, based on empirical data) a torque loss associated with the belt 140 based on stored data and the engine speed or BSG speed to correct the torque command. At optional 320, the control system 182 determines an optimized torque split of the total torque request between the first and second axles 120a, 120b for the illustrated configuration of the electrified powertrain 102 in FIG. 1 based on the estimated belt torque loss and to minimize battery power. Otherwise (i.e., for other multi-motor electrified powertrain configurations), the optimized split/distribution between the multiple electric motors is obtained. At 324, the control system 182 determines torque commands for the engine 104 and the first and second electric motors 136, 176 based on the determined optimized multi-motor torque split.

Finally, at 328, the control system 182 controls the electrified powertrain 102 based on the determined torque commands for the engine 104 and the first and second electric motors 136, 176 and the method 300 ends or returns to 304 for one or more additional cycles. As previously discussed, these torque commands are better optimized and therefore result in greater overall electrified powertrain torque compared to a conventional torque split that does not account for the torque loss associated with the belt.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A torque control system for a multi-motor electrified powertrain of an electrified vehicle, the multi-motor electrified powertrain comprising an engine and first and second electric motors, the torque control system comprising:
    a non-transitory memory having instructions stored thereon; and
    a control system comprising one or more processors configured to execute the instructions thereby causing the control system to:
        determine a total torque request to be satisfied by the multi-motor electrified powertrain, wherein the first electric motor is connected to a crankshaft of the engine via a belt as part of a belt-driven starter-generator (BSG);
        estimate a torque loss associated with the belt based on stored data and an engine speed or a BSG speed;
        determine an optimized torque split of the total torque request between the first and second electric motors based on the estimated belt torque loss and to minimize battery power;
        determine torque commands for the engine and the first and second electric motors based on the determined optimized torque split; and
        control the multi-motor electrified powertrain based on the determined torque commands for the engine and the first and second electric motors,
    wherein the torque commands are optimized and therefore result in greater overall multi-motor electrified powertrain torque compared to a conventional torque split that does not account for the torque loss associated with the belt.

2. The torque control system of claim 1, wherein the losses used to optimize the torque split are a quadratic fit for a given electric motor speed as a function of the commanded electric motor torque.

3. The torque control system of claim 2, wherein a donut-shaped region is defined in an $T_X/T_Y$ torque domain for minimum and maximum battery power.

4. The torque control system of claim 3, wherein an optimized torque split equation solved for Ty produces a line, and wherein an intersection of the line with the donut-shaped region corresponds to the optimal torque split.

5. The torque control system of claim 4, wherein the optimal torque split is an intersection point of the line with the donut-shaped region that is closest to an origin point of the line.

6. The torque control system of claim 1, wherein the engine and the BSG are associated with a first axle of the electrified vehicle and the second motor is associated with a different second axle of the electrified vehicle.

7. The torque control system of claim 6, wherein the first axle is front axle and the second axle is a rear axle, and wherein the optimized torque split is a front/rear torque split between the first/front and second/rear axles.

8. The torque control system of claim 1, wherein the control system is not configured to increase an engine torque command as a function of a first electric motor torque command.

9. A torque control method for a multi-motor electrified powertrain of an electrified vehicle, the multi-motor electrified powertrain comprising an engine and first and second electric motors, the method comprising:
    determining, by a control system, a total torque request to be satisfied by the multi-motor electrified powertrain, wherein the first electric motor is connected to a crankshaft of the engine via a belt as part of a belt-driven starter-generator (BSG);
    estimating, by the control system, a torque loss associated with the belt based on stored data and an engine speed or a BSG speed;
    determining, by the control system, an optimized torque split of the total torque request between the first and second electric motors based on the estimated belt torque loss and to minimize battery power;
    determining, by the control system, torque commands for the engine and the first and second electric motors based on the determined optimized torque split; and
    controlling, by the control system, the multi-motor electrified powertrain based on the determined torque commands for the engine and the first and second electric motors,
    wherein the torque commands are optimized and therefore result in greater overall multi-motor electrified powertrain torque compared to a conventional torque split that does not account for the torque loss associated with the belt.

10. The method of claim 9, wherein the losses used to optimize the torque split are a quadratic fit for a given electric motor speed as a function of the commanded electric motor torque.

11. The method of claim 10, wherein a donut-shaped region is defined in an $T_X/T_Y$ torque domain for minimum and maximum battery power.

12. The method of claim 11, wherein an optimized torque split equation solved for Ty produces a line, and wherein an intersection of the line with the donut-shaped region corresponds to the optimal torque split.

13. The method of claim 12, wherein the optimal torque split is an intersection point of the line with the donut-shaped region that is closest to an origin point of the line.

14. The method of claim 9, wherein the engine and the BSG are associated with a first axle of the electrified vehicle and the second motor is associated with a different second axle of the electrified vehicle.

15. The method of claim 14, wherein the first axle is front axle and the second axle is a rear axle, and wherein the optimized torque split is a front/rear torque split between the first/front and second/rear axles.

16. The method of claim 9, wherein the control system is not configured to increase an engine torque command as a function of a first electric motor torque command.

* * * * *